| United States Patent [19] | [11] | 4,242,320 |
|---|---|---|
| Clarke | [45] | Dec. 30, 1980 |

[54] REDUCTION OF FERRIC CHLORIDE

[75] Inventor: John A. Clarke, Avonmouth, England

[73] Assignee: Mineral Process Licensing Corporation, The Hague, Netherlands

[21] Appl. No.: 37,683

[22] Filed: May 10, 1979

[30] Foreign Application Priority Data

May 16, 1978 [GB] United Kingdom ............... 19989/78

[51] Int. Cl.$^3$ ............................................. C01G 94/10
[52] U.S. Cl. .................................. 423/493; 423/469; 423/79
[58] Field of Search ................. 423/493, 79, 469, 500, 423/568, 633, 632

[56] References Cited

U.S. PATENT DOCUMENTS 3,690,828   9/1972   Baetz et al. .......................... 423/149
4,140,746   2/1979   Turner et al. ..................... 423/500 X

FOREIGN PATENT DOCUMENTS 1522065   5/1968   France .

Primary Examiner—Earl C. Thomas
Attorney, Agent, or Firm—Barry G. Magidoff

[57] ABSTRACT

The invention relates to a method for the reduction of ferric chloride to produce ferrous chloride. The method comprises using gaseous sulphur or a gaseous sulphur chloride in which the atomic ratio of sulphur to chlorine is more than 1:1 as the reducing agent. The reaction is conveniently performed in a fluidised bed. According to a particular aspect, the ferric chloride reduction forms part of a process for the recovery of chlorine values from iron chloride by-produced by industrial processes such as the chlorination of a titaniferrous or aluminous material.

11 Claims, No Drawings

REDUCTION OF FERRIC CHLORIDE

This invention relates to a method for the reduction of ferric chloride.

More particularly this invention relates to a method for the partial dechlorination of ferric chloride to ferrous chloride in the presence of one or more suitable reducing agents.

According to a particular aspect of this invention the partial dechlorination of ferric chloride is a step in a method for the recovery of the chlorine values from iron chloride obtained as a by-product, for example, from the chlorination of a titaniferrous material containing more than 5% by weight iron oxide such as ilmenite, or obtained as a by-product from the chlorination of an aluminous material, such as bauxite.

U.S. Pat. No. 4,140,746 describes a process for the recovery of the chlorine values from iron chloride obtained as a by-product from the chlorination of a titaniferrous material containing more than 5% by weight iron oxide which comprises the steps of:

(a) subjecting ferric chloride to partial dechlorination in the presence of one or more suitable reducing agents to produce ferrous chloride and a chloride compound;

(b) subjecting ferrous chloride to an oxidation reaction in the presence of oxygen or a molecular oxygen-containing gas at a temperature between 300° C. and 1200° C. to produce ferric chloride and ferric oxide; and (c) recycling the resulting ferric chloride to the partial dechlorination step (a).

Similar methods for recovering the chlorine values from iron chloride are disclosed in U.S. patent application Ser. No. 37,718, filed Aug. 10, 1979 relating to iron chloride by-produced in the chlorination of an aluminous material e.g. bauxite.

In those processes, a suitable reducing agent for stage (a) is defined as one which meets the two following conditions: first that it is effective in dechlorinating ferric chloride to ferrous chloride; second, that in reaction with ferric chloride, it produces a chloride compound which, directly or after further processing, is either suitable for recycle to the chlorination process (if appropriate) or has other industrial utility.

One such suitable reducing agent described in the U.S. Pat. No. 4,140,746 and U.S. patent application Ser. No. 37,718, filed Aug. 10, 1979 is sulphur, and the method of using it was summarised in the following equation (1):

$$Fe_2Cl_6(s) + 2S(l) \rightarrow FeCl_2(s) + S_2Cl_2(g) \qquad (1)$$

(where (s) represents solid, (l) represents liquid and (g) represents gas).

Thus in equation (1) liquid sulphur is reacted with solid ferric chloride to produce solid ferrous chloride and gaseous sulphur monochloride.

The method of using sulphur as the reducing agent for ferric chloride, which is summarised in equation (1), has been established experimentally as an effective and successful procedure. However, it has two major drawbacks. First, it requires that the ferric chloride produced in the oxidation stage (b) is condensed from the gas stream, which is a costly and elaborate procedure. Second, the equipment required for contacting the mixing liquid sulphur with solid ferric chloride is, again, costly and elaborate.

It has now surprisingly been found that the reaction represented by equation (1) can be carried out much more conveniently and advantageously using gaseous sulphur or a gaseous sulphur chloride in which the atomic ratio of the sulphur to chlorine is more than 1:1.

The fact that this reaction can be successfully carried out is surprising because the literature suggests that sulphur monochloride is increasingly decomposed into sulphur and chlorine as its temperature rises, until at the boiling point of sulphur (444° C.) it is fully decomposed. Thus the use of gaseous sulphur or gaseous sulphur chloride in which the atomic ratio of sulphur to chlorine is more than 1:1 to produce sulphur monochloride and ferrous chloride by reaction with ferric chloride did not appear promising.

Nevertheless, it has been found that sulphur or gaseous sulphur chloride in which the atomic ratio of sulphur to chlorine is more than 1:1 is an effective reducing agent for gaseous ferric chloride, particularly when used in a gas fluidised bed of solid ferrous chloride.

Thus, the present invention provides a method of reducing ferric chloride to ferrous chloride wherein ferric chloride in the gaseous or solid state is partially dechlorinated in the presence of gaseous sulphur or a gaseous sulphur chloride in which the atomic ratio of sulphur to chlorine is more than 1:1 to form ferrous chloride in the solid state in accordance with the following reaction equations:

$$Fe_2Cl_6(g/s) + S_2(g) \rightarrow 2FeCl_2(s) + S_2Cl_2(g) \qquad (2)$$

$$2\tfrac{1}{2}Fe_2Cl_6(g/s) + S_5Cl_2(g) \rightarrow 5FeCl_2(s) + 2\tfrac{1}{2}S_2Cl_2(g) \qquad (3)$$

In these equations, the second term in equation (3) represents an example of a sulphur chloride on which the atomic ratio of sulphur to chlorine is more than 1:1. In practice a gaseous mixture of $S_2Cl_2$ and S may be employed as the sulphur chloride.

The method according to the present invention is particularly suited to be the partial dechlorination step (a) of a method for the recovery of the chlorine values from iron chloride.

Thus the ferric chloride input to the method summarised in equations (2) and (3) preferably derives from the processes disclosed in U.S. Pat. No. 4,140,746 and U.S. patent application Ser. No. 37,718, filed Aug. 10, 1979. However, the present invention is not limited to ferric chloride derived from any particular source.

The reaction between gaseous sulphur/gaseous sulphur chloride and ferric chloride is preferably carried out in a fluidised bed of (product) ferrous chloride. The bed temperature should be at least sufficient to maintain the sulphur or sulphur chloride in the gas phase. The actual minimum temperature for this purpose will vary with the composition of the source of sulphur values and with the quantity of any inert gases present in the reactor. Thus the overall temperature limits for the reaction are between 120° C. and 650° C., preferably between 200° C. and 450° C. and more particularly between 300° C. and 450° C.

Alternatively, a stirred bed reactor or a rotary kiln could be used. The reaction is preferably carried out continuously.

The sulphur values, either as elemental sulphur or as a sulphur chloride in which the atomic ratio of sulphur to chlorine is more than 1:1, are preferably introduced to the reactor as a gas, but may also be introduced as a liquid in which case the liquid is immediately gasified by contact with the hot reaction bed prior to reaction of the sulphur chloride with the ferric chloride.

The ferric chloride is preferably introduced to the reactor as a gas, but may also be introduced as a solid.

The off-gas from the reactor is preferably condensed to a liquid and centrifuged to remove solid particles (ferric and ferrous chloride). The resulting sulphur chloride, which is predominantly $S_2Cl_2$, may then be treated by various methods depending on the industrial circumstances to the plant. If the ferric chloride feed to the process according to the invention has been obtained by a sulpho-chlorination process, for example a bauxite sulpho-chlorination process, it is preferred to recycle the $S_2Cl_2$ to the sulpho-chlorination process.

However, if the ferric chloride feed has been obtained by a carbo-chlorination process, for example an ilmenite carbo-chlorination, it is preferred to pass the $S_2Cl_2$ to a fractional distillation process. By fractional distillation, chlorine is recovered as the overhead product and a sulphur chloride with between 60% and 80% atomic percent sulphur is obtained as the bottom product which can then be recycled to the reduction process according to the invention. Alternatively, the $S_2Cl_2$ obtained from the off-gas may be reacted with carbon disulphide to produce carbon tetrachloride which can be used either for recycle to the carbo-chlorination reaction or for sale to other industrial processes, with the by-product sulphur being recycled to the reduction reaction: or the $S_2Cl_2$ product may be reacted with carbon monoxide to produce phosgene which may be recycled to the carbo-chlorination reaction or passed for sale to other industrial processes, with the by-product sulphur or sulphur chloride being recycled to the reduction reaction.

Where fractional distillation is employed, it is preferred to perform the distillation in two stages. In a first stage $S_2Cl_2$ is fed to a first distillation column which operates at atmospheric pressure with an overhead temperature of between 20° C. and 60° C. and a bottom temperature of between 140° C. and 180° C. such that there are produced a sulphur-rich bottom product and a chlorine-rich overhead product. The bottom product which preferably contains between 60 and 80% atomic percent of sulphur is recycled for the reduction of ferric chloride. in a second stage, the chlorine-rich sulphur chloride overhead product from the first distillation column is fed to a second distillation column which is operated at a pressure of about 10 atmospheres with an overhead temperature of between 20° C. and 60° C. and a bottom temperature of between 160° C. and 220° C. Pure elemental chlorine is produced as the overhead product and a sulphur chloride in which the atomic ratio of sulphur to chlorine is approximately equal is produced as the bottom product. The chlorine overhead product can, for example, be recycled to the chlorination process from which the ferric chloride was obtained and the sulphur chloride bottom product may be recycled to the first distillation column.

Instead of the two-stage distillation process, just described, a single-stage distillation process may be employed although this is more energy intensive. In the case of a single-stage distillation process, it is preferred to use an elevated pressure of about 10 atmospheres, with an overhead temperature of between 20° C. and 60° C. and a bottom temperature between 200° C. and 240° C. to produce the same products as in the two-stage process.

The ferrous chloride bed overflow from the reduction reactor is preferably converted to ferric chloride and ferric oxide by reaction with a controlled quantity of oxygen or air, as disclosed for stage (b) of the process, described in United States Patent No. 4,140,746 and in U.S. patent application Ser. No. 37,718, filed Aug. 10, 1979 relating to the recovery of chlorine values from iron chloride derived from various sources. The resulting iron chloride is preferably recycled to the reduction reaction which is the subject of this invention.

The invention is further illustrated by the following Examples:

EXAMPLE 1

A 100 mm diameter bed of ferrous chloride was fluidised at 380° C. using a gas mixture analysing:
4 l/min ferric chloride gas
2 l/min nitrogen
4 l/min sulphur chlorine mixture
(atomic ratio sulphur to chlorine:—2:1)

The ferric chloride and sulphur/chlorine mixture entered the bed through separate orifices and the off-gas was found to have reacted completely to give a sulphur monochloride off-gas with negligible residual ferric chloride. The ferrous chloride reaction product reported to the reaction bed.

EXAMPLE 2

The distillation of $S_2Cl_2$ produced according to the equation (3) was carried out in a 80 mm diameter Inconel column, which was used for both stages as set out below. For convenience, the quantities of feed material used in each stage were not matched since the critical constraint was the heat load on the condenser. Samples were collected for analysis after three hours running time, and the results are given below. The theoretical heats (i.e. the heat input at the bottom and the heat load on the condensers) were up to 50% greater in practice, at the feed rates specified.

|  | Stage 1 | Stage 2 |
| --- | --- | --- |
| Pressure: | Atmospheric | 10 Atmospheres |
| Packing: | 1.06 meters of Knitmesh Multifil packing (equivalent to 20 theoretical plates) | 1.6 meters of Knitmesh Multifil packing (equivalent to 30 theoretical plates) |
| Location of Feed Plate: | Center of Column | 60% of packing below and 40% above. |
| Theoretical Heat Input at Bottom: | 47 Kcal/mole/feed | 14 Kcal/mole/feed |
| Heat Load on Condenser: | 34 Kcal/mole/feed | 8.5 Kcal/mole/feed |
| Feed Analysis: | 100% $S_2Cl_2$ | 90 mole % $SCl_2$ 10 mole % $S_2Cl_2$ |

-continued

|  | Stage 1 | Stage 2 |
|---|---|---|
| Top Product Analysis: | 90 mole % SCl$_2$ 10 mole % S$_2$Cl$_2$ | 100% Cl$_2$ (99.7 ± 0.3%) |
| Bottom Product Analysis: | 80 mole % S 20 mole % S$_2$Cl$_2$ | 100% S$_2$Cl$_2$ (98 ± 2%) |
| Reflux Ratio: | 5 | 3 |
| Feed Rate & Temperature: | 27 moles/hour at 20° C. | 170 moles/hour 20° C. |
| Top Production Rate & Temp. | 22 moles/hour at 50° C. | 76 moles/hour 30° C. |
| Bottom Production Rate & Temp. | 25 moles/hour at 160° C. | 93 moles/hour 210° C. |

I claim:

1. In a method for the reduction of ferric chloride in the presence of a reducing agent to produce ferrous chloride, the improvement which comprises using a reducing agent selected from the group consisting of gaseous sulphur and gaseous sulphur chlorides in which the atomic ratio of sulphur to chlorine is more than 1:1, and performing the reduction at a temperature of between about 120° C. and 650° C.

2. The method according to claim 1, wherein the reducing agent consists essentially of gaseous sulphur.

3. The method according to claim 1, wherein the reducing agent consists essentially of a mixture of gaseous S$_2$Cl$_2$ and gaseous S.

4. The method according to claim 1, wherein the reaction is performed in a fluidised bed of ferrous chloride.

5. The method according to claim 1, wherein the temperature is between about 200° C. and 450° C.

6. The method according to claim 5, wherein the temperature is between about 300° C. and 450° C.

7. The method according to claim 1, wherein the reducing agent is introduced in the gaseous state to a reactor in which the reaction is performed.

8. The method according to claim 1, which further comprises subjecting the ferrous chloride product to an oxidation reaction with an oxidising agent selected from the group consisting of oxygen and oxygen-containing gases to produce ferric chloride and ferric oxide and recycling the resulting ferric chloride to the reduction reaction.

9. The method according to claim 8, wherein the ferric chloride is derived directly or indirectly from an iron chloride by-produced in a process comprising chlorinating a material selected from the group consisting of titaniferrous and aluminous materials.

10. The process of claim 1 wherein the ferric chloride is present as a vapor.

11. The method according to claim 10, comprising obtaining a vapor phase mixture of materials comprising ferric chloride, and admixing the vapor phase mixture with the reducing agent.

* * * * *